US010733182B2

(12) United States Patent
Sutton et al.

(10) Patent No.: US 10,733,182 B2
(45) Date of Patent: Aug. 4, 2020

(54) METHOD AND SYSTEM FOR AGGREGATE BANDING

(71) Applicant: FUTRIXIP LIMITED, Wellington (NZ)

(72) Inventors: Ian James Sutton, Wellington (NZ); Syuzanna Vartkesovna Zakharova, Macedonia, OH (US)

(73) Assignee: Healthagen International Limited, Croydon (GB)

( * ) Notice: Subject to any disclaimer, the term of this patent is extended or adjusted under 35 U.S.C. 154(b) by 351 days.

(21) Appl. No.: 14/102,198

(22) Filed: Dec. 10, 2013

(65) Prior Publication Data
US 2014/0164381 A1 Jun. 12, 2014

Related U.S. Application Data

(60) Provisional application No. 61/735,493, filed on Dec. 10, 2012.

(51) Int. Cl.
*G06F 17/24* (2006.01)
*G06F 16/242* (2019.01)
*G06F 16/28* (2019.01)

(52) U.S. Cl.
CPC ........ *G06F 16/244* (2019.01); *G06F 16/2428* (2019.01); *G06F 16/287* (2019.01)

(58) Field of Classification Search
CPC ........... G06F 17/3071; G06F 17/30864; G06F 17/30598
USPC ....................................................... 707/737
See application file for complete search history.

(56) References Cited

U.S. PATENT DOCUMENTS

| 6,055,540 | A  | * | 4/2000  | Snow ...................... G06F 16/30 |
| 6,285,998 | B1 | * | 9/2001  | Black ..................... G06Q 40/00 |
| 6,484,162 | B1 | * | 11/2002 | Edlund ............... G06F 16/2428 |
| 7,966,305 | B2 | * | 6/2011  | Olsen .................... G06F 16/951 |
|           |    |   |         | 707/706 |

(Continued)

FOREIGN PATENT DOCUMENTS

WO   2005/098608 A2   10/2005

OTHER PUBLICATIONS

"SQL Union and Union All", Aug. 8, 2008, W3Schools, <https://www.w3schools.com/sql/sql_union.asp>.*

(Continued)

*Primary Examiner* — Hosain T Alam
*Assistant Examiner* — Robert F May
(74) *Attorney, Agent, or Firm* — Leydig, Voit & Mayer, Ltd.

(57) ABSTRACT

The invention provides a method of aggregate banding comprising defining an aggregate banding dimension for a first data source, the aggregate banding dimension including at least one aggregation variable, at least one banding variable, and at least one band based at least partly on the at least one banding variable; summarizing the data source based at least partly on the at least one aggregation variable, the summary including at least one distinct value of the at least one aggregation variable; and defining a mapping relationship of the at least one distinct value of the at least one aggregation variable to the or respective band(s) based on the value of the at least one banding variable. The invention further provides related systems and processor-executable instructions.

20 Claims, 14 Drawing Sheets

(56) References Cited

U.S. PATENT DOCUMENTS

| | | | | |
|---|---|---|---|---|
| 8,615,504 | B2* | 12/2013 | Urmy | G06Q 10/0631 707/706 |
| 2002/0065856 | A1* | 5/2002 | Kisiel | G06F 16/30 715/259 |
| 2003/0050865 | A1* | 3/2003 | Dutta | G06Q 30/02 705/26.61 |
| 2005/0283466 | A1* | 12/2005 | Dettinger | G06F 16/2425 |
| 2012/0331568 | A1* | 12/2012 | Weinstein | H04L 12/185 726/29 |

OTHER PUBLICATIONS

"In SQL, how can you 'group by' in ranges?", Nov. 9, 2008, Stack Overflow, <http://stackoverflow.com/questions/232387/in-sql-how-can-you-group-by-in-ranges>.*

"HDMS Enhances DART with Addition of ANalysis Groups", Jun. 29, 2012, Which Open Source, <http://www.whichopensource.com/content/hdms-enhances-dart-with-addition-of-analysis-groups>.*

W3Schools "SQL—Joins" Jun. 30, 2012 Copyright 1999-2012 by Refsnes Data.*

Dr. Ramon Lawrence "How to Query Multipel Databases and Generate Reports" Jul. 27, 2012 <unityjdbc.com/doc/multiple/multiplequery.php>.*

W3Schools "SQL—Joins" Jun. 30, 2012 Copyright 1999-2012 by Refsnes Data (Year: 2012).*

Dr. Ramon Lawrence "How to Query Multipel Databases and Generate Reports" Jul. 27, 2012 <unityjdbc.com/doc/multiple/multiplequery.php> (Year: 2012).*

"HDMS Enhances Dart with Addition of ANalysis Groups", Jun. 29, 2012, Which Open Source, <http://www.whichopensource.com/content/hdms-enhances-dart-with-addition-of-analysis-groups> (Year: 2012).*

"In SQL, how can you 'group by' in ranges?", Nov. 9, 2008, Stack Overflow, <http://stackoverflow.com/questions/232387/in-sql-how-can-you-group-by-in-ranges> (Year: 2008).*

* cited by examiner

FIGURE 6

METHOD AND SYSTEM FOR AGGREGATE BANDING

CROSS-REFERENCE TO RELATED APPLICATION

This application claims the benefit of U.S. Provisional Application No. 61/735,493 filed Dec. 10, 2012 entitled Method and System for Aggregate Banding, which is hereby incorporated by reference herein in its entirety.

FIELD OF INVENTION

The invention relates to a method and system for aggregate banding.

BACKGROUND

It is often necessary to answer specific analytic questions that involve a particular range (or ranges) of values of some entity in the data. This capability is often required to meet one or more of the following requirements:
- self-service (no need for administrators or the IT department to be involved)
- non-technical (no special skills or knowledge required)
- easy-to-use
- data source agnostic (no specific set up requirements of source data)
- interface agnostic (any number of ways of accessing these analytic capabilities)
- reproducible (once set up these can be re-run with new data and re-used by others)
- fast It is difficult to identify segments of a population meeting certain criteria and then use these segments for analysis for further questions and analysis. The following are some examples of typical business questions that require answers:
- HealthCare: What is the total Paid Amount that is generated by High Cost Claimants (where High Cost Claimant is a Patient with over $30,000 in total claims).
- HealthCare: How much is the total Paid Amount and how it compares between Claimants that had different number of Inpatient Admits (1 vs. 2 vs. 3 vs. more than 3).
- HealthCare: How does the number of Drug Prescriptions compare between Claimants that have different number of Inpatient Admits (1 vs. 2 vs 3 vs. more than 3)
- Sales: What are the total number of Products and their total Cost sold by various tier Sales People (where the tiers are "Sales People with Less than $10,000 in total sales per person", "Sales People with $10,000-$50,000 in total sales per person", and "Sales People with Over $50,000 in total sales per person").
- Retail: What are the most common products purchased by people who spend more than $500 per visit to the supermarket, and what are the most common products this year versus last year.

The mechanism to do this type of analysis needs to be able to work for data of any nature:
- any industry
- any division within a company
- any volume of data
- on any entity dimension even if it has very high cardinality (e.g. Customer ID, Individual ID, or even Transaction ID)

Self-service: It is one thing for programmers and IT staff to be able to create these types of segmentation rules in advance based on defined user requirements, but ideally End Users should be able to create these segmentation rules themselves with no help or resources from any programmer or IT staff member. Also it is important for them to be able to create these for immediate use for "on-the-fly" analysis so that the moment they define what they are interested in, they can use it.

Easy-to-use: This type of analysis should be possible without any specialist technical or programming knowledge. i.e. an End User should be able to answer all these types of questions without needing to understand where or how the data is stored or structured. They should not need to know how to program in any query language (such as SQL or MDX).

The user should be able to answer these business/analytical questions via a simple point-and-click interface and they need not be concerned with the complexities of what processing is required to answer their question.

Data Source Agnostic: These analytical methodologies should not depend on what query engine is used, or how the data is stored or structured.

It also shouldn't matter if End Users set up their metadata for these types of analysis and over time (in the future), the data source changes to a different structure or database. If the underlying data source changes then whatever analyses that the End Users have created in the past should still work, and seamlessly switch over to use these new data sources.

"Creation Data Source" and "Application Data Source" Independence: The data source that the segmentation rules are created with may not be the data source that it is desired to use the derived relationship with. For example:
- HealthCare: To analyze drug usage of the patients with various frequency of ER visits, it is necessary to define the bands of population using Outpatient Claims data (that contains ER visits) to define patients and their corresponding number of ER visits, grouping them into bands (e.g. 1-2 ER visits, 3-5 ER visits, more than 5 ER visits). And then to analyze drug usage by these patients, it is necessary to apply the bands (Mapping Relationship between the Patient IDs and the Bands) to the Pharmacy claims data, which contains the Patient ID, to see how many drug prescriptions per patient were issues in different bands.
- HealthCare: To analyze Cost per Member based on the Size of the Family, it is necessary to define the Bands based on the Enrollment data, which contains all members of the plan, including their family members covered by the plan. It is then possible to define the bands to be various family sizes (e.g. Single, Plus One, Family of 3-4, Family with more than 4 members), and then apply these bands to any claims data (which contains Member ID) to analyze cost per member or other claim relevant information based on the Family size of the plan subscriber.

Even though the "complete analysis" may come from two independent data sources, it should not be a requirement that these two data sources are merged at any point or at any aggregation level. These data sources could be massive and therefore any performance or storage requirements for the merge of them should be avoided.

Interface Agnostic: The use of Aggregate Banding should not be tied to any specific interface. For example it should be possible to provide Aggregate Banding via one or more of the following interfaces/environments:
- Desktop (thick client)
- Web Interface
- Flash Application
- Mobile device (e.g. iPhone and iPad app, or Android app)

Batch processing (scripted approach)

Installed on own servers

Available via SaaS from a multi-tenancy environment

Reproducibility: Any analysis that is created, or segmentation rules that are created should be able to be shared between End Users, and a single definition should be able to be used by more than one report/analysis. Also it should be able to be defined once and re-used again in the future (once the underlying data is updated), published for others to make use of (but not necessarily be able to see or change the segmentation rules).

Within a multi-tenancy SaaS environment it should be possible to define a single set of segmentation rules and to be able to use this same definition across any number of tenants of the service utilizing their own data.

It is an object of preferred embodiments of the present invention to address some of the aforementioned disadvantages. An additional or alternative object is to at least provide the public with a useful choice.

SUMMARY OF THE INVENTION

In one aspect the invention comprises a method of aggregate banding comprising defining an aggregate banding dimension for a first data source, the aggregate banding dimension including at least one aggregation variable, at least one banding variable, and at least one band based at least partly on the at least one banding variable; summarizing the data source based at least partly on the at least one aggregation variable, the summary including at least one distinct value of the at least one aggregation variable; and defining a mapping relationship of the at least one distinct value of the at least one aggregation variable to the or respective band(s) based on the value of the at least one banding variable.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in similar manner.

Preferably the at least one band includes a or respective numeric boundaries and/or thresholds.

Preferably the at least one band includes a or respective user-readable labels.

Preferably the method further comprises applying at least one detail filter to the summary of the data source.

Preferably the method further comprises applying at least one aggregate filter to the summary of the data source.

Preferably the method further comprises querying the second data source based at least partly on the mapping relationship.

In a second aspect the invention comprises a computer-readable medium having stored thereon processor-executable instructions that, when executed by a processor, cause the processor to perform a method of aggregate banding comprising defining an aggregate banding dimension for a first data source, the aggregate banding dimension including at least one aggregation variable, at least one banding variable, and at least one band based at least partly on the at least one banding variable; summarizing the first data source based at least partly on the at least one aggregation variable, the summary including at least one distinct value of the at least one aggregation variable; defining a mapping relationship of the at least one distinct value of the at least one aggregation variable to the or respective band(s) based on the value of the at least one banding variable; and querying the second data source based at least partly on the mapping relationship Preferably the at least one band includes a or respective numeric boundaries and/or thresholds.

Preferably the at least one band includes a or respective user-readable labels.

Preferably the method further comprises applying at least one detail filter to the summary of the data source.

Preferably the method further comprises applying at least one aggregate filter to the summary of the data source.

In a further aspect the invention comprises an aggregate banding system comprising a processor configured to define an aggregate banding dimension for a first data source, the aggregate banding dimension including at least one aggregation variable, at least one banding variable, and at least one band based at least partly on the at least one banding variable; summarize the data source based at least partly on the at least one aggregation variable, the summary including at least one distinct value of the at least one aggregation variable; define a mapping relationship of the at least one distinct value of the at least one aggregation variable to the or respective band(s) based on the value of the at least one banding variable; and query the second data source based at least partly on the mapping relationship.

Preferably the at least one band includes a or respective numeric boundaries and/or thresholds.

Preferably the at least one band includes a or respective user-readable labels.

Preferably the processor is further configured to apply at least one detail filter to the summary of the data source.

Preferably the processor is further configured to apply at least one aggregate filter to the summary of the data source.

As used herein the term "and/or" means "and" or "or", or both.

As used herein "(s)" or "(ies)" following a noun means the plural and/or singular forms of the noun.

As used herein the term "dimension" means:
a variable/column in the data (numeric or character) that is used for data classification and/or filtering (e.g. Product ID, Region, Item Description). It is used from a "group by" categorical perspective and will have a set of distinct values; or
a "virtual variable/column" that is created by this process, i.e. the Aggregate Banding created is a "dimension" that is available to end users for analysis (classification and/or filtering), but does not actually exist in the original data source, instead it is dynamically derived on the fly. i.e. it doesn't physically exist in the database, however to the end user performing queries or producing tables and charts from the data, this Virtual Dimension appears and works as if it does exist, not just in the data source they first define it from but a variety of other data sources as well.

This invention consists of three core areas:

1. Metadata that define the segments (Bands) of interest
2. Creation of the Mapping Relationship
3. Use of the Mapping Relationship within another query Mechanism to create a Virtual Dimension that can be used for classification and/or filtering within any query. Where the attributes of the metadata that defines this Virtual Dimension provide the analytical flexibility of what it can represent, thereby enabling the End User to arbitrarily define clusterings/bands on any Dimension, in any data source, using thresholds of any Measure available to that data source, and then to use this clustering for analysis on a variety of other data sources.

One example is a Virtual Dimension in the database that doesn't physically exist in the source data. To the End User performing queries or producing tables and charts from the data, this Virtual Dimension appears and works as if it does exist, not just in the data source they first define it from but a variety of other data sources as well.

Aggregate Banding provides a mechanism for summarizing the data to establish a Mapping Relationship between a set of classification data column/variable(s) (the Aggregation Dimension(s) e.g. Patient ID) and a set of segmentation bands based on another numeric column/variable(s) (the Measure e.g. Cost), and then this Mapping Relationship can be used for further aggregation of any data containing the same Aggregation Dimension(s) (e.g. Patient ID).

The following is a preferred form summary of an aggregate banding technique.

1. Define Aggregate Banding Dimension by specifying:
   data source (Data Source A)
   aggregation column/variable(s) (Dimension A)
   banding column/variable(s) (Measure A)
   set of one or more Bands containing numeric boundaries/thresholds for each Band and user-friendly labels for each Band
2. Apply Aggregate Banding to any data source (Data Source B) that contains the aggregation column/variable(s) (Dimension A):
   Creation of the Mapping Relationship
      i. Summarize "Data Source A" by "Dimension A", keeping the totals for "Measure A", applying any detail filters that are defined as part of the Aggregate Banding Dimension
      ii. Apply any Post-Aggregation Filters to the above summarized query results
      iii. Use the result of the above summary and the values of "Measure A" totals to map each distinct value of "Dimension A" to a particular Bucket ID for the Band (many-to-one relationship) depending if the value of "Measure A" falls between band's numeric boundaries.
      iv. Save the Mapping Relationship (temporary or cache storage)
   Use of Mapping Relationship to utilize analysis within the query of interest
      i. Summarize "Data Source B" by "Dimension A" (and any other Dimensions as needed for analysis) and apply any detail level query filters if necessary (if any filtering on the Aggregate Banding Dimension then transform that filter to an equivalent one on the Aggregation Dimension).
      ii. Replace the values of "Dimension A" by the corresponding Bucket ID from the Mapping Relationship and summarize again.
      iii. Convert the Bucket IDs to the user friendly Band labels for reporting to the End User

BRIEF DESCRIPTION OF FIGURES

Preferred forms of a method and system for aggregate banding are described with reference to the accompanying figures by way of example and without intending to be limiting, wherein:

FIG. 6 shows an example of creating a new Aggregate Banding Dimension.

DETAILED DESCRIPTION

Figure 1:
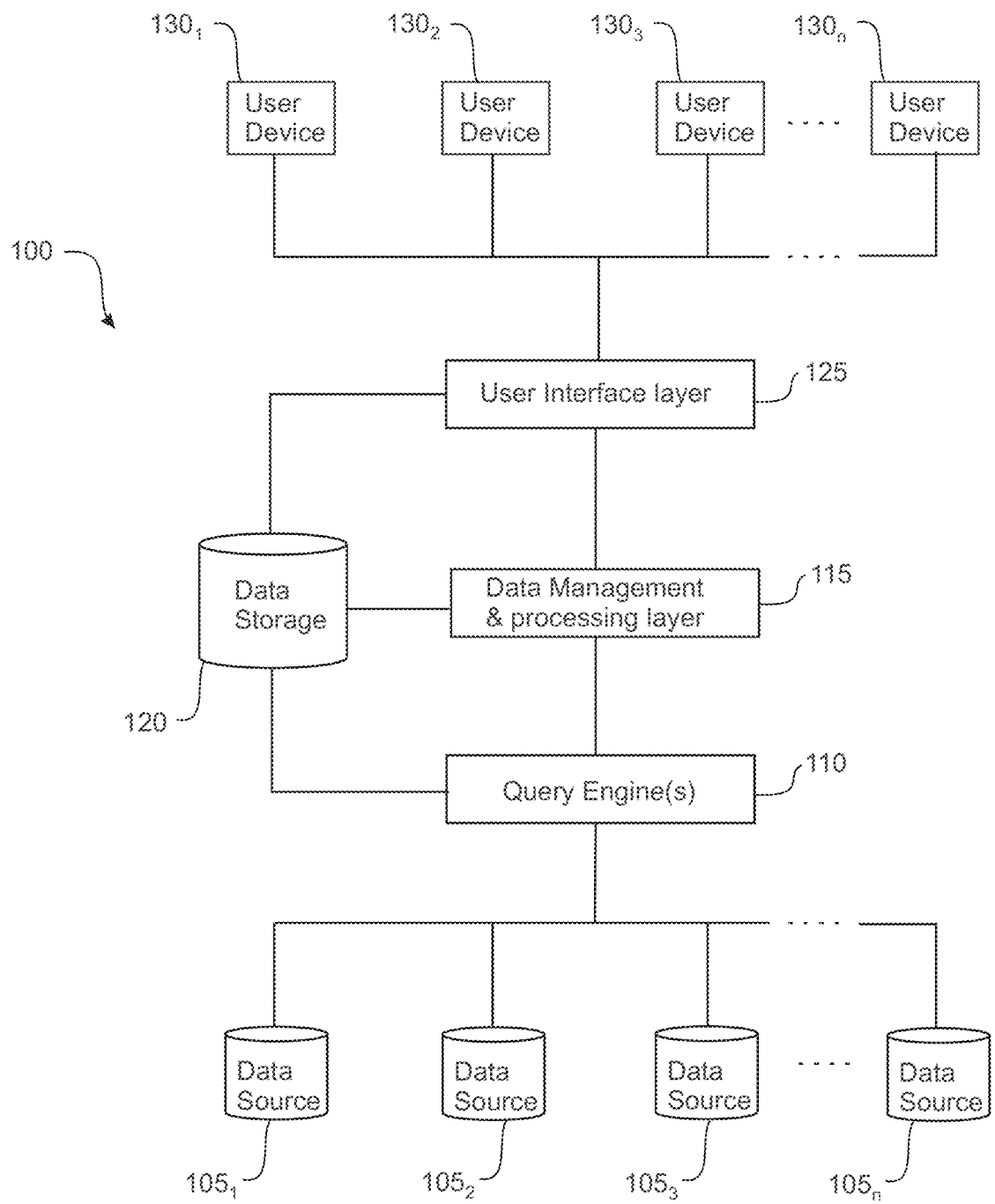
FIG. 1 shows a preferred form system in which the invention is intended to operate.

FIG. 1 shows a preferred form system 100 in which the invention is intended to operate. The system includes a plurality of data sources indicated at $105_{1...N}$. The data in data sources $105_{1...N}$ is stored on one or more data storage devices. One or more query engines 110 is/are adapted to perform queries on one or more of the data sources 105.

The system 100 further includes a data management and processing layer 115. The data management layer is interfaced to the query engine(s) 110. It is configured to delegate responsibility to one or more of the query engines to obtain data from data sources 105.

Result sets obtained by the data management layer 115 are preferably stored in a data storage component 120.

A user interface layer 125 is preferably in communication with the data management layer 115 and data storage 120. The user interface is configured to present output to a user and receive user input that is then delegated to the data management layer 115.

The system also includes a plurality of user devices $130_1 ... _N$. It is envisaged that there are many different forms of user device 130 and user interface layer 125. Examples include a desktop (thick client), a web interface, a flash application, a mobile device, and a batch processing device using a scripted approach. The user devices 130 in one form have a version of the user interface layer 125 and the data management layer 115 installed on servers in communication with the user devices 130.

Preferably the data storage 120 provides temporary and/or caching data storage to the data management layer 115, the query engine(s) 110 and/or the user interface 125.

Figure 2:
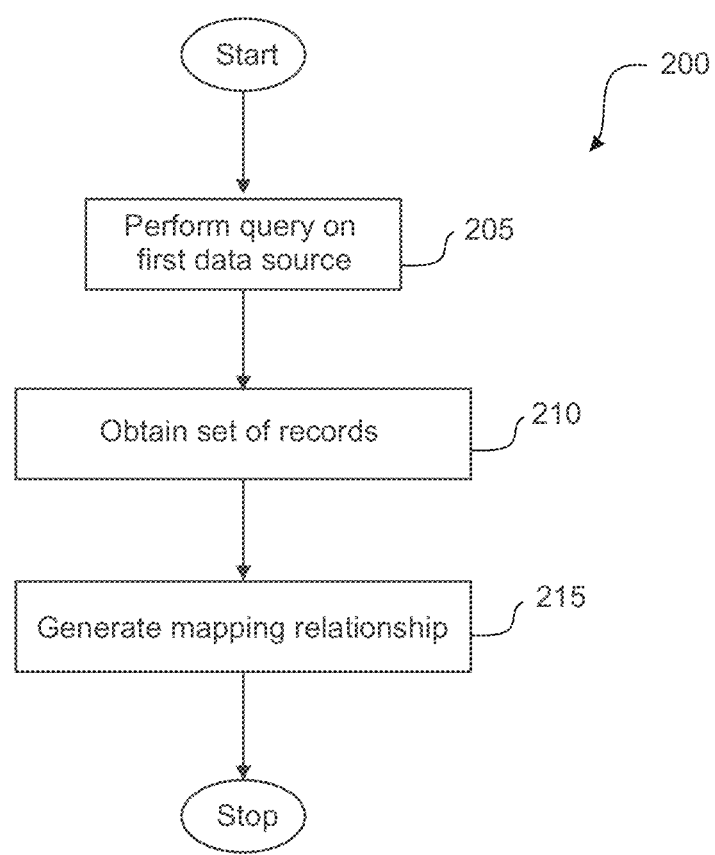
FIG. 2 shows a preferred form process for aggregate banding.

FIG. 2 shows a preferred form process 200 for performing aggregate banding in accordance with one aspect of the invention. As shown in FIG. 2 the preferred form method involves performing 205 a query on a first data source. Preferably user device 130 and user interface layer 125 issue a direction to data management layer 115. The data management layer 115 then delegates a query to a query engine 110 to query data source $105_1$.

The result of the query is a summary of the first data source, based at least partially on the at least one aggregation dimension variable and including at least one banding variable. Examples are provided below.

The data management layer 115 generates 215 a mapping relationship from the results set preferably stored in data storage 120. The result is preferably a mapping between at least one distinct value of the aggregation dimension variable and the corresponding band(s) based on the values of the at least one banding variable.

The mapping relationship is then presented to the user through the user interface layer 125 and/or used as a filter for subsequent queries to one or more of the data sources 105 and/or used to cluster values of the Aggregation Dimension together into the band(s) in subsequent queries to one or more of the data sources 105 to then enable comparison between the various bands.

The following metadata is required in order to create and use an Aggregate Banding Dimension:
Name
Data Source
Aggregation Dimension(s)
Measure(s) the band thresholds are based on
Band definitions
   thresholds/boundaries
   labels of the bands between the thresholds
Optional: Detail Filter(s)
Optional: Post-Aggregation Filter(s)
Create Mapping Relationship on One Data Source The first step in the processing of an analysis that uses the Aggregate Banding Dimension is to create the Mapping Relationship from the distinct ID values of the Aggregation Dimension(s) to the Band(s) they are in. The following are the required steps to create the Mapping Relationship:
1. Query: Summarize to Aggregate Dimension(s) values and Measure(s)
2. Add Banding "Bucket ID" values based on Measure values and Band definition
3. Store "Mapping Relationship"

The following example shows a customer spending at a supermarket point of sale transaction. The Aggregation Dimension is Customer ID and the Measure is a sale amount.
Name: Customer Spending
Data Source: Supermarket Point of Sale Transactions
Aggregation Dimension(s): Customer ID
Measure(s): Sale Amount
Band(s):
Less than $200 (Bucket ID=B1)
$200-$999 (Bucket ID=B2)
$1000 and Above (Bucket ID=B3)

The following table shows the results of the query to the level of the Aggregation Dimension with the appropriate "Bucket ID" Banding values added:

| Distinct ID Values (Customer ID) | Measure (Sale Amount) | Bucket ID |
| --- | --- | --- |
| 1000001 | $390 | B2 |
| 1000002 | $1200 | B3 |
| 1000003 | $140 | B1 |
| 1000004 | $370 | B2 |
| 1000005 | $2000 | B3 |

The following table shows an example of the Mapping Relationship that will be stored:

| Customer ID | Bucket ID |
| --- | --- |
| 1000001 | B2 |
| 1000002 | B3 |
| 1000003 | B1 |
| 1000004 | B2 |
| 1000005 | B3 |

Use of Mapping Relationship on Another Data Source

Even though the Mapping Relationship is created on one specific data source, the use of this Mapping Relationship could be on the same data source or an entirely different data source. All it needs is to have the same Aggregation Dimension(s) available. There are two primary ways that the Aggregate Banding Dimension can be used in other queries:
Classification/Grouping (i.e. a "group by" type SQL action)
Filtering
Aggregate Banding Dimension Used for Classification:

The following are the required steps to use the Aggregate Banding Dimension for Classification:
1. Query 1: Primary Query including the Aggregate Banding Dimension (replace the Aggregate Banding Dimension by the Aggregation Dimension(s) to be used in "group by")
2. Query 2: Aggregate again rolling up the distinct values of the Aggregate Dimension(s) to the "Bucket ID" values Note for Query 2: All measure statistics need to be aggregatable (Sum, Max, Min, etc.) or if they are derivable then it is the aggregatable statistics that they depend on that need to be calculated (e.g. "Average" is not aggregatable but what it depends on are, i.e. Average=Total/Number of Values, and Total and Number of Values are aggregatable so these are what need to be used in the multi-phase aggregation queries, and then the Average is calculated once all aggregation is complete).

An example may be to determine how many different promotional offers were sent to Customers with various spending levels.
Data Source: Supermarket Marketing Promotions Data Source
Classification Dimension (the Aggregate Banding Dimension): Customer Spending
Measure: Number of Offers per Customer
1) Summarize by Aggregation Dimension(s) (Customer ID)
2) Replace Customer ID with corresponding Bucket ID from the Mapping Relationship
3) Summarize by Bucket ID The following table shows the results of the Query 1:

| Distinct ID Values (Customer ID) | Bucket ID (added in from Mapping Relationship) | Measure (Number of Offers per Customer) |
| --- | --- | --- |
| 1000001 | B2 | 5 |
| 1000002 | B3 | 10 |
| 1000003 | B1 | 7 |
| 1000004 | B2 | 5 |
| 1000005 | B3 | 12 |

The following table shows the results of Query 2 after the second phase of aggregation to Band level and also with the user friendly Band labels added in:

| Bucket ID | Customer Spending | Numbers of offers per customer |
|---|---|---|
| B1 | Less than $200 | 7 |
| B2 | $200-$999 | 10 |
| B3 | $1000 and above | 22 |

In some cases it is possible to perform these queries in one step (by using a clustering/grouping technique as part of the original query that is run). For example, by using a "dimension table" or in the SAS programming language this can be done by the use of a SAS Format.

Aggregate Banding Dimension Used for Filtering:

The filter on the Aggregate Banding Dimension is translated into a filter on the Aggregation Dimension that the Aggregate Banding Dimension is based on, then the query runs as normal.

Query Request: filters (including one on the Aggregate Banding Dimension)+classifications+measures
1. Replace the Aggregate Banding Dimension filter with a new filter that uses the Aggregate Dimension that it depends on, where these will resolve to the same rows.
2. Run the Query Filter operators honored and how filter translated:
=, IN
NOT logic Values of the Aggregate Banding Dimension in the filter are replaced with the corresponding Aggregation Dimension Values from the Mapping Relationship. For example:
"Customer Spending=$1000 and Above"
  becomes "Customer Spending=B3"
  becomes "Customer_ID IN ('1000002', '1000005')"
"Customer Spending NOT IN (Less than $200, $200-$999)"
  becomes "Customer Spending NOT IN (B1, B2)"
  becomes "Customer ID NOT IN ('1000001', '1000004', '1000003')"

There is a special case when the filter includes the "Other" Band. "Other" is a special Bucket ID that is not mapped to any specific values of' the Aggregation Dimension. Instead it is a band for all values that are not part of the Mapping Relationship, this could include values that were filtered out via Detail Filters or Post-Aggregation Filters used by the Aggregate Banding Dimension, as well as any values that map into Ignored Bands.

When this special Bucket ID is used in the filter, it is not possible to replace it with the list of corresponding values of the Aggregation Dimension, firstly because that Bucket ID is not explicitly stored in the Mapping Relationship and secondly because it might potentially include a very large list of values.

To deal with this situation, the following logic is used:
The list of Aggregate Banding Dimension values (Bucket IDs) in the filter (that also includes "Other" Bucket ID) is replaced with all other Bucket IDs that were not in the filter, and the filter is negated. This will eliminate the presence of the "Other" Bucket ID from the filter. For example;
If all bucket IDs are (B1, B2, B3, B4) and B4 is the implicit "Other" Bucket ID that is not stored in the Mapping Relationship), then the filter "Customer Spending IN (B1, B4)" would become "Customer Spending NOT IN (B2, B3)"
Then the resulting filter values are replaced with the corresponding values of the Aggregation Dimension based on the Mapping Relationship. Continuing the example from above;

"Customer Spending NOT IN (B2, B3)" then becomes the final filter "Customer ID NOT IN ('1000001', '1000004', '1000002', '1000005')"

Aggregate Banding Dimension Used for Both Filtering and Classification:

It is possible to have a single query that uses the Aggregate Banding Dimension for both filtering and classification by:
  amending the primary query with additional filter as described above for the filtering side of things
  adding the aggregation dimension to the classification dimensions and then using the second phase aggregation to get the results set to the correct banded level Metadata to Enable "Aggregation Dimension" to be Linked Between Different Data Sources:

Given that the Mapping Relationship can be created on one data source and used on a different data source it is important to ensure that the Aggregation Dimension represents the same entity between different data sources. As these can be different data sources the column/variable that is used for the Aggregation Dimension will be different and it may even have a different column/variable name in the different data sources. A mechanism is needed to ensure that metadata is defined to link different Dimensions that are registered within the metadata to enable the processing to know which data sources an Aggregate Banding Dimension can be used with.

The preferred approaches to handle this Dimension linking are:
  To have a matrix of the Dimension definitions and all the data sources that use it. Thereby there is a single Dimension with one set of attributes even though it is available from different data sources.
  To have a global Dimension definition that is stored independently from any data source, and then any dimension can link to this global Dimension definition to use its attributes and also for the purposes of this Aggregate Banding to know that all Dimensions that are linked to this global Dimension can be considered to represent the same entity.

Data Source Agnostic Querying:

Any additional functionality/features that require querying of the data is preferably implemented in a single/ standard way by setting up appropriate metadata for the query, and then the query is performed by the corresponding query engine, which is unaware of the additional features. This allows the application to support any number of query engines, and add any number of additional features without having to implement each feature within each query engine.

Every query goes via a standard query interface layer which then delegates responsibility to the appropriate query engines that are supported.

Above this query tier, all metadata about queries to perform and what analyses the user wants to produce are in a standard form that do not have any dependencies with the underlying data sources—i.e. they are stored in a manner that is data source agnostic.

Additional Analytic Capability: Specify Filters as Part of Aggregate Banding Dimension By specifying Detail Filters for the Aggregate Banding, the user is able to limit the values of the Aggregation Dimension that are mapped to Bucket IDs by reducing the subset of the data being summarized. For example, limiting the summary only to a particular time period or region.

By specifying Post-Aggregation Filters (the ones based on the final totals of any Measure—not just the Measure used for the Band thresholds), the user is potentially able to eliminate or isolate outliers, for example selecting only Top 10 values or Bottom 10.

Figure 3:
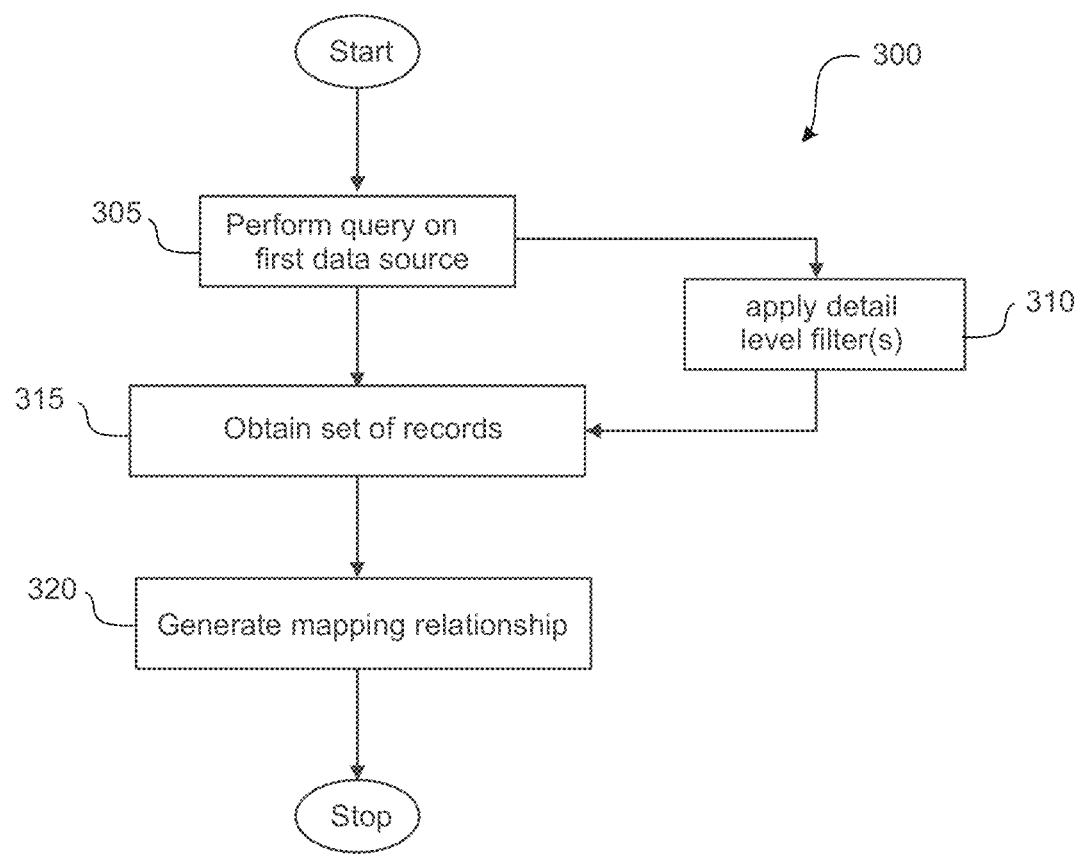
FIG. 3 shows a further preferred form process applying one or more detail level filters.

FIG. 3 shows a preferred form process 300 that uses one or more detail level filters. A query is performed 305 on a first data source. Process 300 is similar to process 200 described above. A detail level filter is optionally applied 310 as part of the query 305 to the first data source.

The set of records obtained 315 also depends on the detail level filter(s) applied to the first data source.

A mapping relationship is then generated 320 as described above.

The mapping relationship is then presented to the user through the user interface layer 125 and/or used as a filter for subsequent queries to one or more of the data sources 105 and/or used to cluster values of the Aggregation Dimension together into the band(s) in subsequent queries to one or more of the data sources 105 to then enable comparison between the various bands.

The use of Detail Level Filters in the creation of the Mapping Relationship changes the process to:
1. Apply detail level filter on source data, so only matching records feed into aggregation.
2. Query: Aggregate to Aggregate Dimension Values and Measure.
3. Add Banding "Bucket ID" values
4. Mapping Relationship is stored.

The following provides an example:
Name: Customer Spending in last Quarter
Data Source: Supermarket Point of Sale Transactions
Aggregation Dimension(s): Customer ID
Measure(s): Sale Amount
Detail Filter(s): Transactions that occurred in the last Quarter Band(s):
Less than $200 (Bucket ID=B1)
$200-$999 (Bucket ID=B2)
$1000 and Above (Bucket ID=B3)

The following table shows the query results with the "Transactions that occurred in the last Quarter" filter applied and with the Banding "Bucket ID" values added.

| Distinct ID Values | Measure | Bucket ID |
| --- | --- | --- |
| 1000001 | $190 | B1 |
| 1000002 | $800 | B2 |
| 1000003 | $200 | B2 |

Mapping Relationship is shown in the following table:

| Distinct ID Values | Bucket ID |
| --- | --- |
| 1000001 | B1 |
| 1000002 | B2 |
| 1000003 | B2 |

Figure 4:
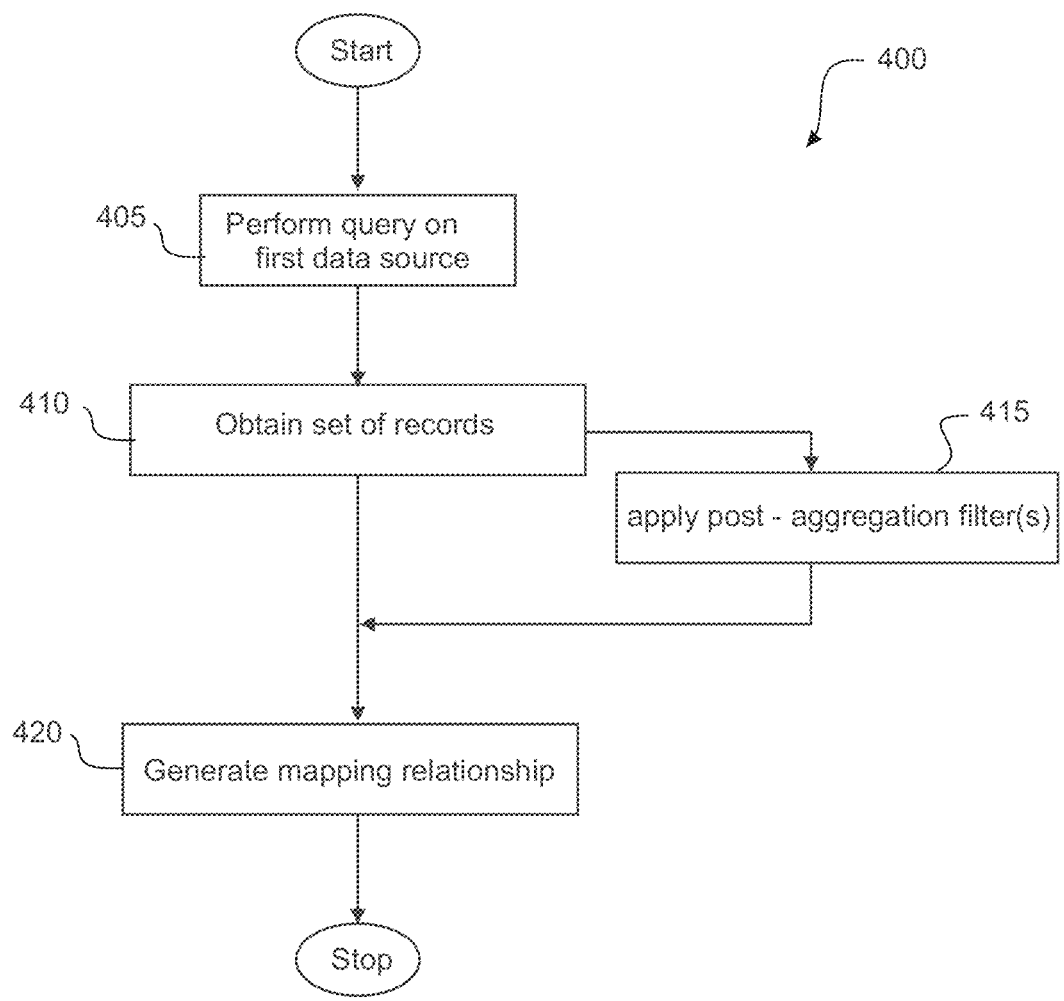
FIG. 4 shows a further preferred form process applying one or more post-aggregation filters.

FIG. 4 shows a preferred form process 400 that uses one or more post-aggregation filters. The process 400 is similar to process 200 and process 300 described above. As shown in FIG. 4 a query is performed 405 on a first data source. A set of records is obtained 410. One or more post-aggregation filters is/are optionally applied 415 to the set of records.

A mapping relationship is then generated 420 as described above.

The mapping relationship is then presented to the user through the user interface layer 125 and/or used as a filter for subsequent queries to one or more of the data sources 105 and/or used to cluster values of the Aggregation Dimension together into the band(s) in subsequent queries to one or more of the data sources 105 to then enable comparison between the various bands.

The use of Post-Aggregation Filters in the creation of the Mapping Relationship changes the process to:
1. Query: Aggregate to Aggregate Dimension Values and Measure (plus any other Measures that the Post-Aggregation Filters may use)
2. Apply filter to the aggregated query results to remove ID values that do not match criteria
3. Add Banding "Bucket ID" for the remaining values
4. Mapping Relationship is stored, and all other values not explicitly stored will be implicitly mapped to the "Other" bucket.

The following provides an example:
Name: Customer Spending by Single Visit Customers
Data Source Supermarket Point of Sale Transactions
Aggregation Dimension(s): Customer ID
Measure(s): Sale Amount
Aggregate Filter(s): Number of Visits=1
Band(s):
Less than $200 (Bucket ID=B1)
$200-$999 (Bucket ID=B2)
$1000 and Above (Bucket ID=B3)

The following table shows Banding "Bucket ID" values:

| Distinct ID Values | Measure (Sale Amount) | Measure (Number of Visits) | Bucket ID |
| --- | --- | --- | --- |
| 1000001 | $390 | 2 | <deleted> |
| 1000002 | $1200 | 1 | B3 |
| 1000003 | $140 | 5 | <deleted> |
| 1000004 | $370 | 1 | B2 |
| 1000005 | $2000 | 1 | B3 |

Mapping Relationship is shown in the following table:

| Distinct ID Values | Bucket ID |
| --- | --- |
| 1000002 | B3 |
| 1000004 | B2 |
| 1000005 | B3 |

Aggregate Banding Dimensions can be created with no filters, or any combination of Detail Level Filters or Post-Aggregation Filters.

Additional Feature: Ignoring Bands

When defining Bands for Aggregate Banding, there will usually be the $1^{st}$ Band that will be "Less than <min threshold>", some intermediate bands and the last Band that will be "Greater than <max threshold>". With these types of bands, it is guaranteed that every single value of the aggregation column/variable(s) will fall into one of the Bands (with the exception of a missing/null value of the Measure), which means the Mapping Relationship between every single distinct value of the Aggregation Dimension and the bands must be stored. The Aggregation Dimension column/variable(s) often include a very high cardinality column/variable (e.g. Member ID, Provider ID, Customer ID, etc.), so the Mapping Relationship to be stored could be quite large.

It is likely that most of the time only certain Bands are actually required for analysis, either the 1$^{st}$ one or the last one or some combination of the first/last/intermediate bands.

It is preferable to identify which bands should be ignored during analysis, in other words, the Mapping Relationship of the Aggregation Dimension(s) values to those bands will not be stored, and those bands will not appear in the final analysis.

This technique of ignoring some Bands is preferably implemented as follows:
1. summarize data source by Aggregation Dimension(s)
2. map the distinct values of the Aggregation Dimension(s) to their appropriate Band
3. check all Bands and delete the row if:
    a. the mapped Band is one of the Bands to be ignored
    b. the Aggregation Dimension(s) value does not map to any of the Bands (this can happen if the Measure value has a missing/null value)
4. save the final Mapping Relationship When applying Aggregate Banding, and replacing values of the Aggregation Variable of the current Viewpoint with the Band label based on the Mapping Relationship, if the value is not in the Mapping Relationship, replace it with a special label (which is specified as part of Aggregate Banding definition as a "label for unmatched and ignored values")

The following provides an example:
Name: Top Spending Customers
Data Source Supermarket Point of Sale Transactions
Aggregation Dimension(s): Customer ID
Measure(s): Sale Amount
Band(s):
Less than $200 (Bucket ID=B1)—Ignore for analysis
$200-$999 (Bucket ID=B2)—Ignore for analysis
$1000 and Above (Bucket ID=B3)
The following table shows Banding "Bucket ID" values:

| Distinct ID Values | Measure | Bucket ID |
|---|---|---|
| 1000001 | $390 | B1 <deleted> |
| 1000002 | $1200 | B3 |
| 1000003 | $140 | B1 <deleted> |
| 1000004 | $370 | B2 <deleted> |
| 1000005 | $2000 | B3 |

The Mapping Relationship is shown in the following table:

| Distinct ID Values | Bucket ID |
|---|---|
| 1000002 | B3 |
| 1000005 | B3 |

Caching:

Caching is an important or useful technique as it avoids duplicating and repeating more work than required. It also facilitates efficiency as it is not necessary to store the entire Mapping Relationship as part of the cache index.

When the Aggregate Banding Dimension is used in another data source and it is used in the query for classification or filtering then it is necessary to store a definition of all the attributes that it depends on so that it can be determined when to re-query the segmentation Mapping Relationship, so there is an index for this Aggregate Banding Dimension based on:

Data Source ID
Datetime Stamp of when the data source was last modified (this is a key part to prevent needing to re-create the Mapping Relationship unless something has changed from a data perspective)
Thresholds of the bands
"Ignore Band" attributes of each band
All "query relevant" Attributes used by dimensions and measures:
    Aggregation Dimension(s)
    Measure(s) used for Bands
    Any Detail Filter(s) or Post-Aggregation Filter(s) and their dependent metadata It is preferable to enable stored/persisted Metadata to define Aggregate Banding Dimension.

The Metadata for Aggregate Banding Dimension is stored independently from the data source or the Viewpoint. Any Viewpoints that use the Aggregate Banding Dimension store the reference to it, but not the actual Aggregate Banding Dimension definition or the Mapping Relationship. This way the definition can be modified, and Reports that use it and reference it, can use the most current definition whenever they run. It also allows for storage of the Metadata at different levels, allowing "global" level that is accessible to all the users, "user group" level, that can be created by a member of a user group and be available to all others members of the same group, as well as "personal" where the definition can only be created and used by the same user who created it.

This also allows for capability to duplicate an existing definition, so it can be modified slightly and saved as a separate Aggregate Banding Dimension, possibly with a different level of access.

The Aggregate Banding Dimensions can be stored independently from any data source within a hierarchical folder structure and these can be stored at the following different levels:
Global level
User Group level
Personal level
Security and Restricted Access:

Not having access to the data source, Aggregation Dimension(s) or Measure(s) may prevent access to Aggregate Banding Dimension if required.

If an End User does not have access to the data source, it is possible to specify that the user would also not be able to access any Aggregate Banding Dimensions that are based on that data source. But, it might be necessary to allow access to the Aggregate Banding Dimension even if the data source is not accessible for direct querying, since in that case the data source would only be used to create the Mapping Relationship for the Aggregate Banding Dimension.

If the user does not have access to the Aggregation Dimension(s), it is possible to control whether or not a user is able to access the Aggregate Banding Dimension(s) that are based on it, as it might be necessary to allow access to the Aggregate Banding Dimension even if the Aggregation Dimension(s) is not accessible to the user.

Security settings preferably allow the Administrator to configure access to the Aggregate Banding Dimension if the data source or the aggregation dimension(s) are restricted from the user.

During Aggregate Banding Dimension creation and usage in a Viewpoint, security is checked and appropriate messages are generated for the user if the Aggregate Banding Dimension is not accessible.

Example User Interface to Create, Maintain and Use Aggregate Banding Dimensions

First the Aggregate Banding Dimension needs to be defined and saved. This can be done via pull-down menu: Create A New Segmentation Dimension→Aggregate Banding Dimension . . . .

As part of its definition, the following must be specified:
Aggregate Banding Dimension Name
Data Source (is automatically set to the data source of the current Viewpoint)
Aggregation Dimension(s)
Based on Measure(s)
Band definition(s)
Filter(s) (Detail or Post-Aggregation), if needed
Scope (Global, User Group, Personal)
As part of saving an Aggregate Banding Dimension, the user can create new folders to organize the Aggregate Banding Dimension into a hierarchical menu structure.

Figure 5:
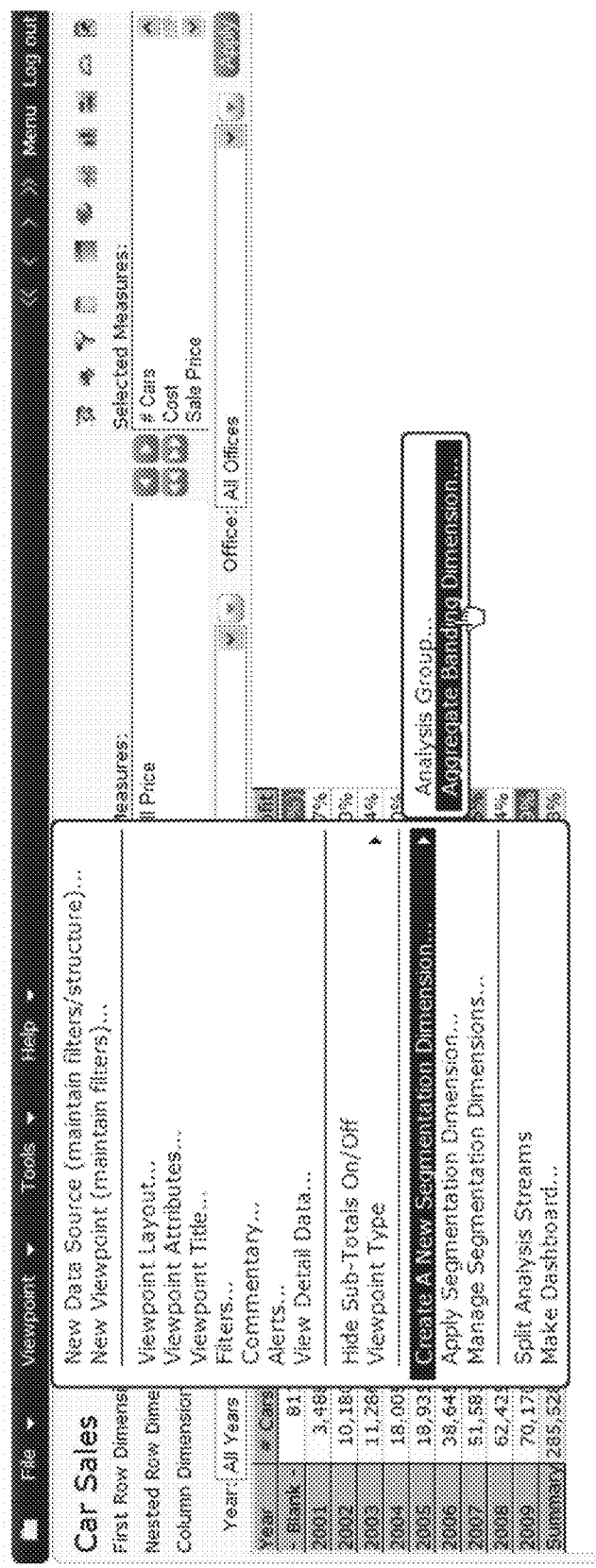
FIG. 5 shows a preferred form start screen for creating a new Aggregate Banding Dimension.

FIG. 5 shows the preferred way of starting the process for creating an Aggregate Banding Dimension.

Figure 6:
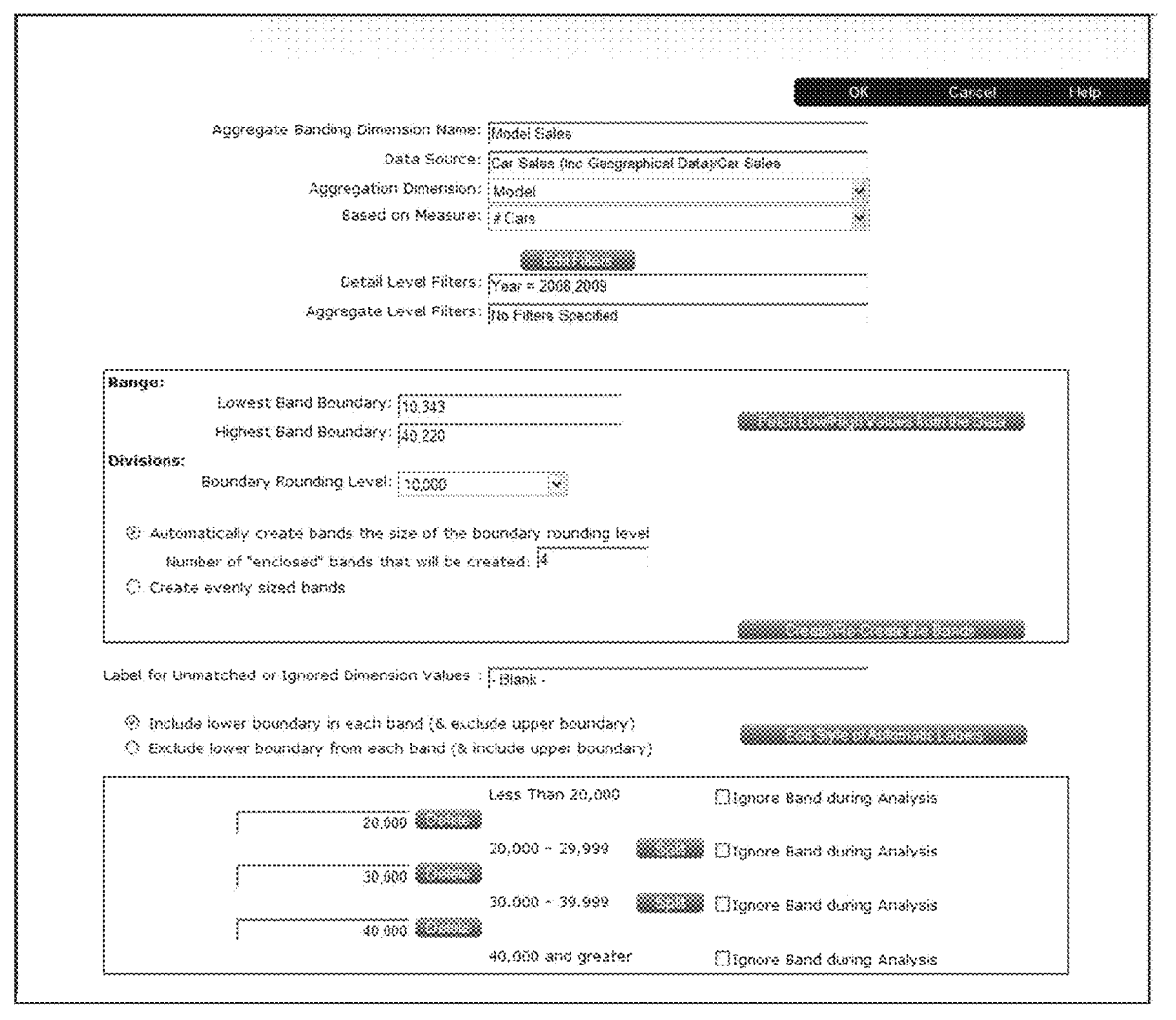

FIG. 6 shows an example of creating a new Aggregate Banding Dimension.

Figure 7:
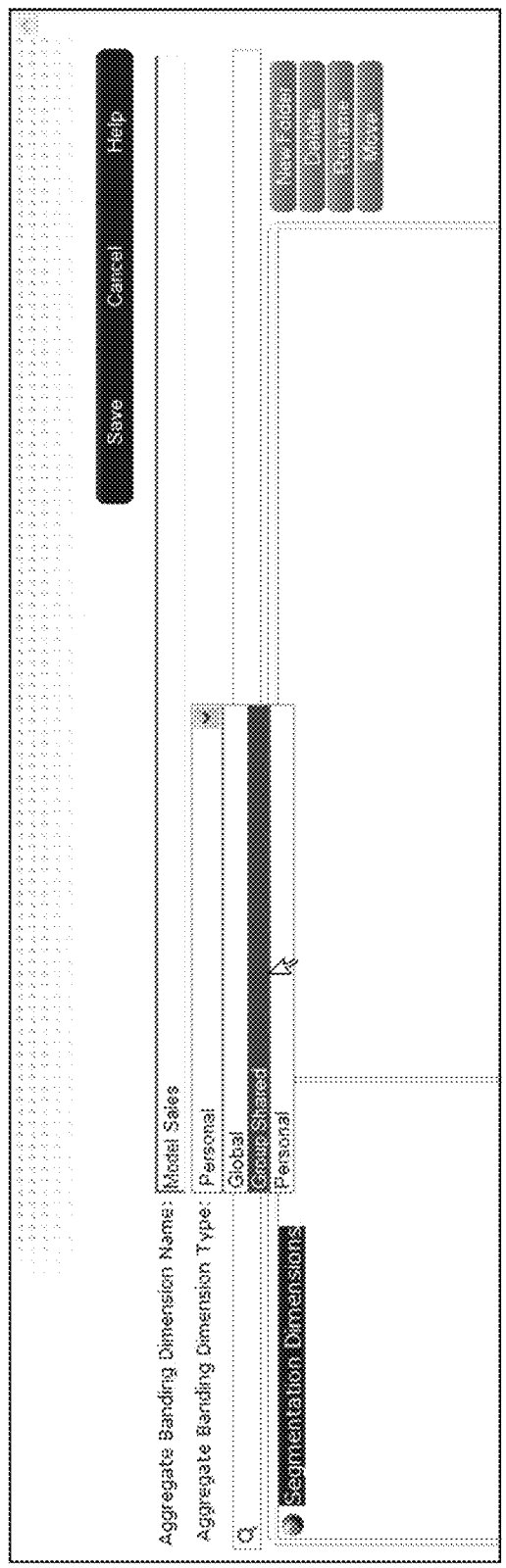
FIG. 7 shows an example of saving a newly created Aggregate Banding Dimension.

FIG. 7 shows an example of saving a newly created Aggregate Banding Dimension to the menu of Segmentation Dimensions.

Once Aggregate Banding Dimensions exist, they can be used within other Viewpoints by selecting which Aggregate Banding Dimension is desired and then "Applying" it to the Viewpoint.

Figure 8:
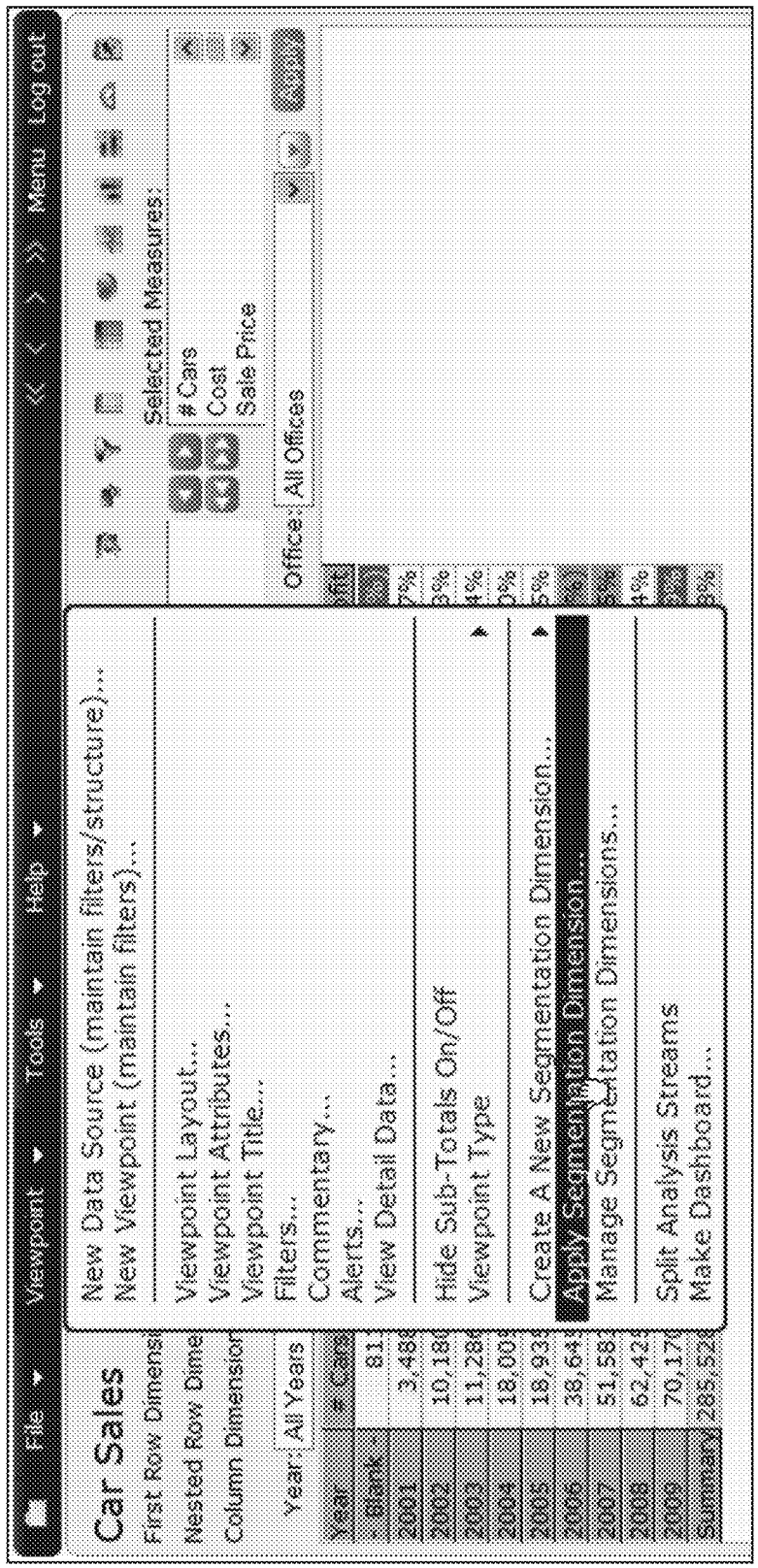
FIG. 8 shows a preferred form pull-down menu for applying segmentation dimensions.

As shown in FIG. 8, once the definition is saved, the same or a different user can "Apply" the Aggregate Banding Dimension to a Viewpoint. The preferred way of doing this is by selecting "Apply Segmentation Dimensions . . . " from the pull-down menu.

Figure 9:
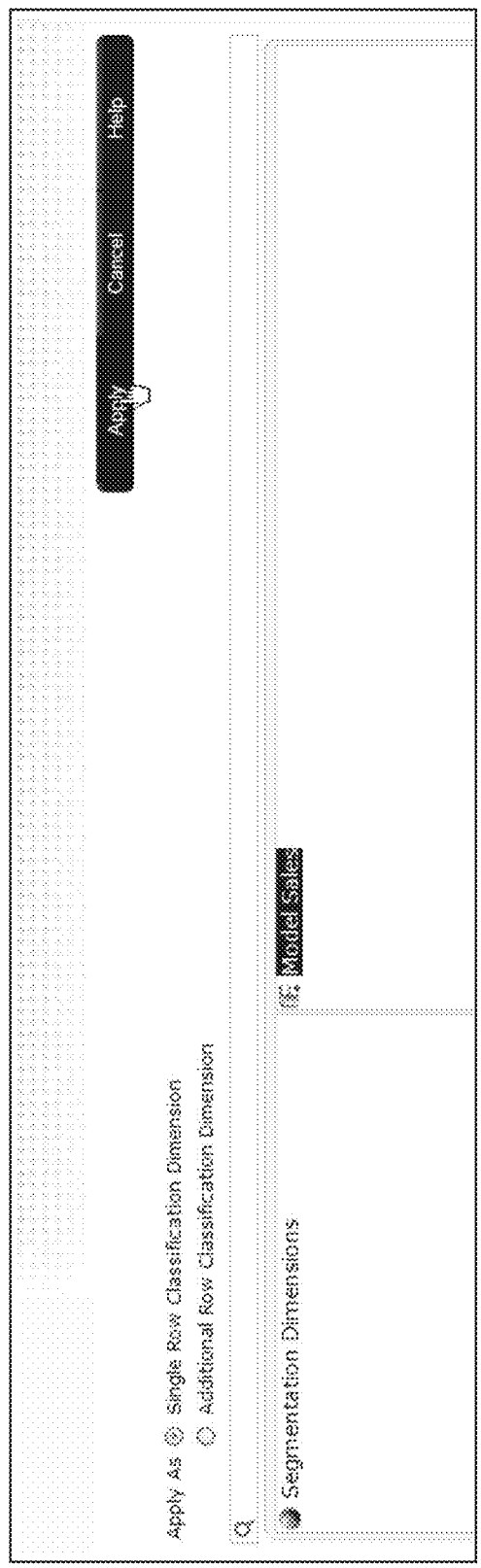
FIG. 9 shows a user applying an Aggregate Banding Dimension.

Then an End User will select the required Aggregate Banding Dimension from the menu, choosing an option to apply it as the only row classification dimension ("Single") or as an additional row classification dimension, and clicking "Apply" button is shown in FIG. 9.

Preferably, only Aggregate Banding Dimensions applicable to the current Viewpoint will be visible in the menu, meaning:
  they are based on an Aggregation Dimension(s) which exists in the data source of the current Viewpoint
  they are based on a data source that is either not restricted from the End User, or the data source is configured not to restrict Segmentation Dimensions based on it.

As part of the application process, the following steps are preferably performed automatically:
  The data source specified in the definition of the Aggregate Banding Dimension is summarized by the Aggregation Dimension(s) with the filters applied (if any).
  The result of this summarization is used to map each value of the Aggregation Dimension(s) to a particular Band, based on the summary value of the Measure(s) specified in the Aggregate Banding Dimension definition. The Mapping Relationship is stored in a table/dataset for performance, since it could be quite large.
  The new Virtual Dimension is created and added to the current Viewpoint as a classification dimension, as shown in FIG. 10.

Figure 10:
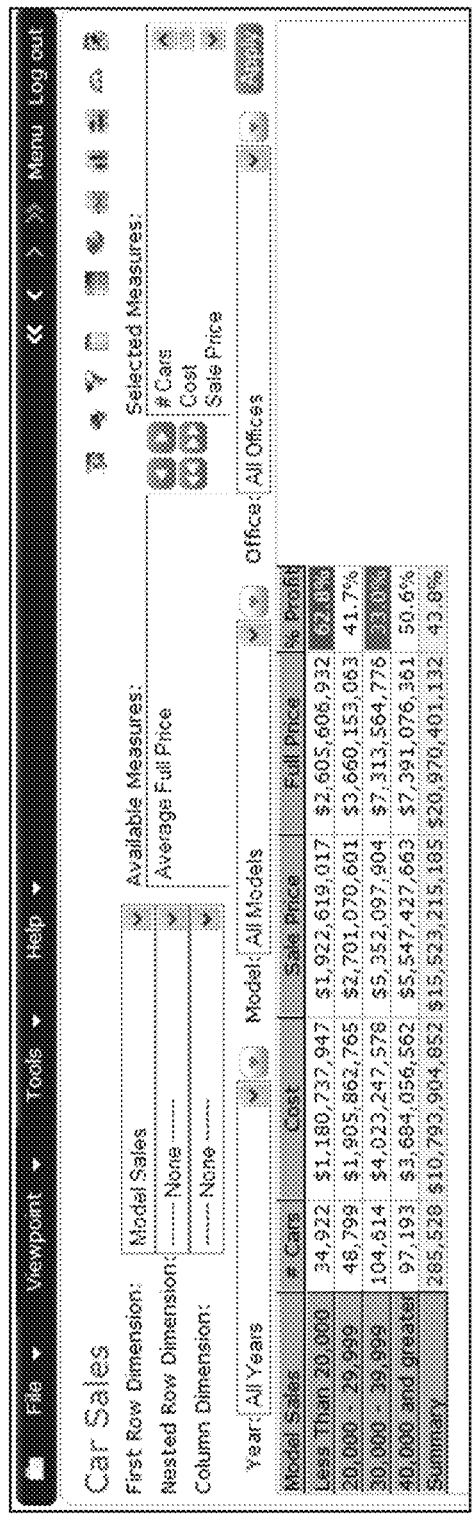
FIG. 10 shows a preferred use of an Aggregate Banding Dimension.

The Viewpoint in FIG. 10 shows the data classified by the Aggregate Banding Dimension "Model Sales", where each value represents particular Models grouped together based on the "# Cars" sold in year 2008 and 2009 (i.e. the attributes that were specified within FIG. 6).

Figure 11:
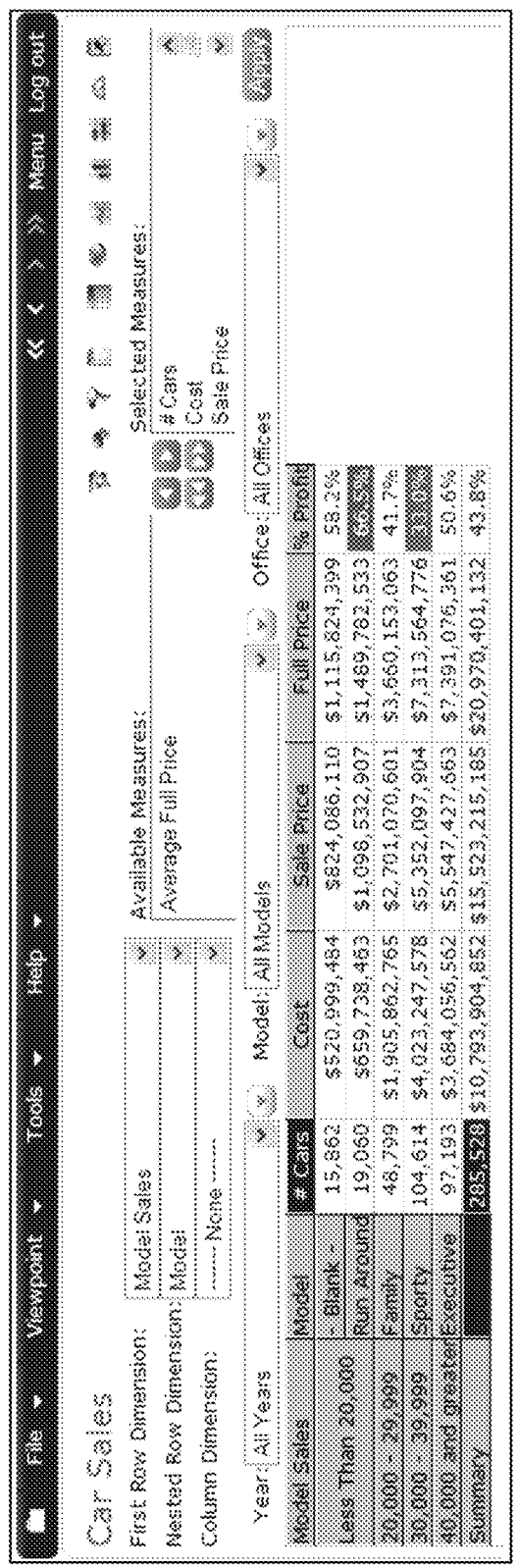
FIG. 11 shows preferred use of an Aggregate Banding Dimension in conjunction with another classification Dimension.

If further classification by Model is performed, it is possible to see which Models were grouped into which Bands as shown in FIG. 11.

Once the Aggregate Banding Dimension is created, it can be used just like any other dimension on the Viewpoint: for classification, in filters, charts, etc.

When the Viewpoint is saved, the Aggregate Banding Dimension used by the Viewpoint is saved with it, but every time the Viewpoint is used, the cache will be checked to see if these query results have already been created, and if they haven't or if any of the data sources or attributes that it depends on have changed then the process of mapping of the Aggregation Dimension values to the Bands is repeated using the current data and the current definition of the Aggregate Banding Dimension (as it could have been modified since first created). So, the process of "applying" an Aggregate Banding Dimension is repeated. Therefore, if neither the definition of the Aggregate Banding Dimension, nor any of the underlying data source or filter metadata attributes have changed, nor the underlying data source has been updated, then preferably the cache is going to be used to produce the Viewpoint using the Aggregate Banding Dimension, which will greatly improve its performance.

Figure 12:
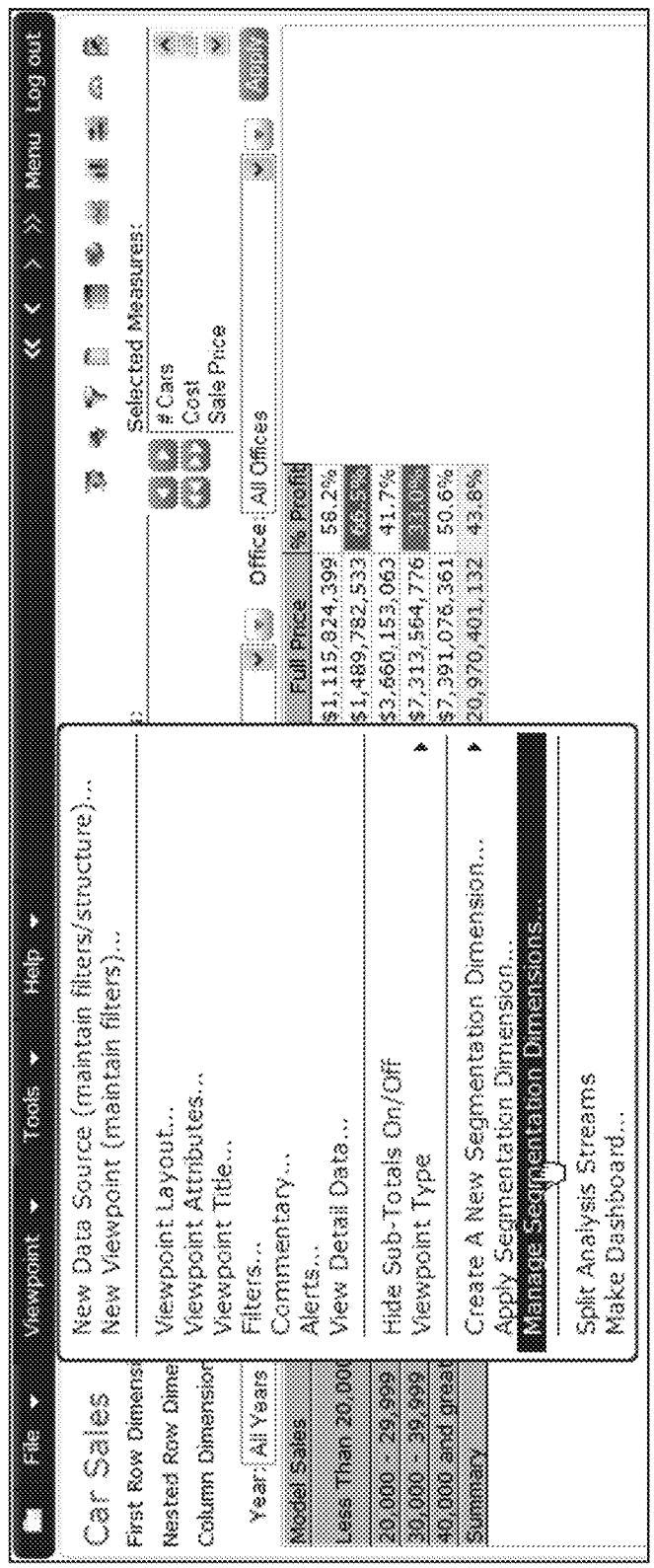
FIG. 12 shows a preferred form process for modifying the definition of Aggregate Banding Dimension.

As mentioned above, the definition of the Aggregate Banding Dimension can be modified. This is done via Viewpoint→Manage Segmentation Dimensions, as shown in FIG. 12. The management screen presents the user with the menu structure containing Aggregate Banding Dimensions (and any other types of Segmentation Dimensions defined).

Figure 13:
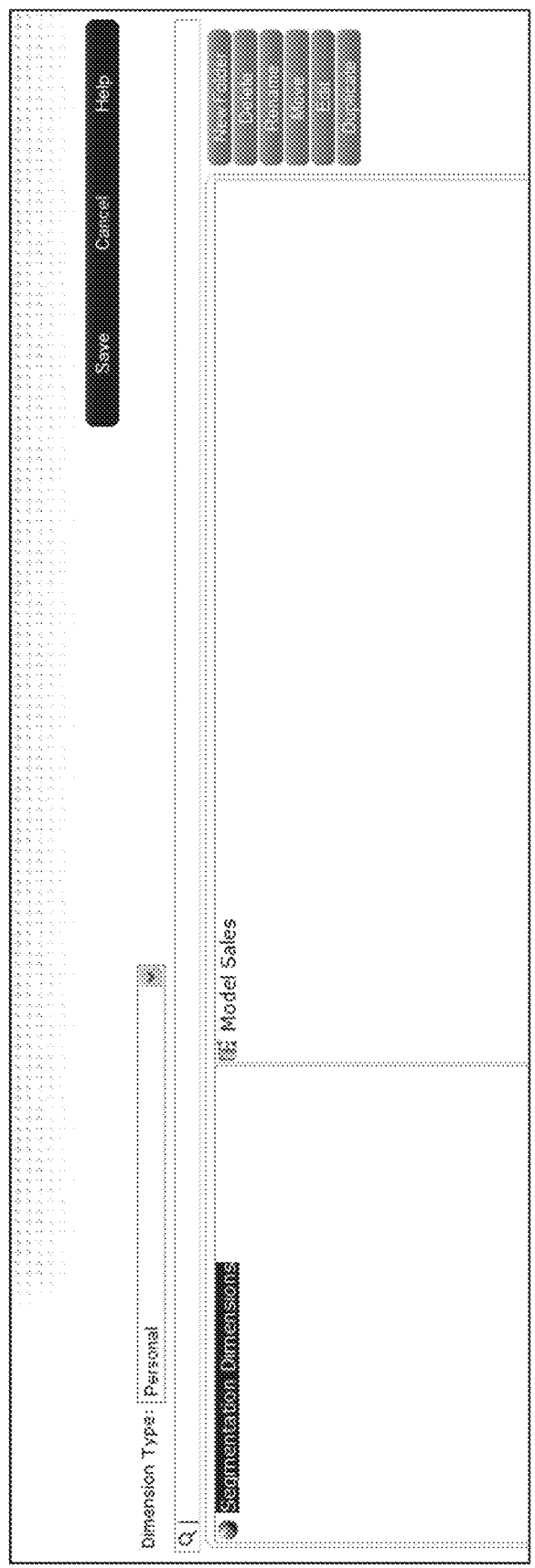
FIG. 13 shows preferred form operations available to a user.

As shown in FIG. 13, the user can create new folders, rename, delete or move any of the objects on the menu, edit an existing Aggregate Banding Dimension or duplicate one.

Figure 14:
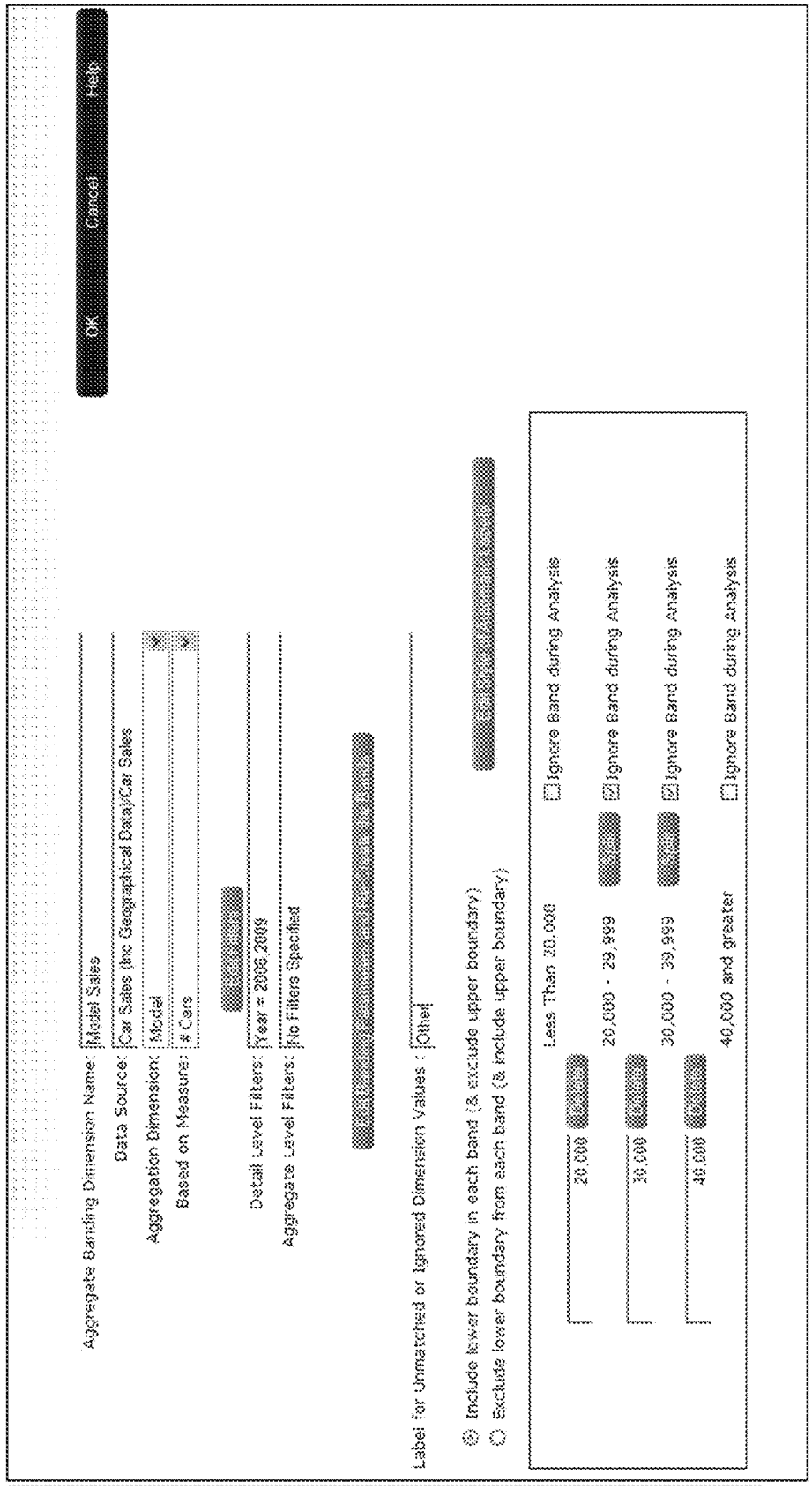
FIG. 14 shows preferred form editing or duplicating the Aggregate Banding Dimension.

While editing or duplicating the Aggregate Banding Dimension, the user can modify any aspect of it, as shown in FIG. 14.

The user can also mark some Bands to be ignored during analysis, meaning the values of the Aggregation Dimension that map to these Bands will not be stored, thus making the process of applying an Aggregate Banding Dimension to a Viewpoint much faster.

Any values of the Aggregation Dimension that do not map to one of the Bands (due to either the applied filters or some Bands being ignored) will all be grouped into a single group. The label for this group can be specified via "Label for Unmatched or Ignored Dimension Values" (as shown within FIG. 14), otherwise it will default to "-Blank-".

The techniques described above have the potential to provide one or more of the following benefits:
  Provides powerful analysis feature by allowing 2-step processing of the data automatically
  Aggregate Banding Dimensions created on the fly by the End Users using a simple and intuitive interface
  Use of this functionality does not require any changes to the underlying data source
  Use of this functionality does not require any administrator involvement
  Completely dynamic and automatic, providing accurate results when the data changes
  Optimized for performance via the use of cache and optimal storage of large number of values
  Aggregate Banding Dimensions can be based on virtual or derived Measures (e.g. a calculated measure that uses a formula across the different numeric banding variables that were aggregated in the summarization, such as bands of "Profit", where profit is calculated using a formula of "Total Sales−Total Costs")

Allows for additional filtering during pre-summarization step, including Aggregate Measure filters (e.g. Top 10 Countries), which can be used to limit the number of distinct dimension values used for banding Allows for "ignoring" some Bands during analysis to improve performance or to simplify results Aggregate Banding Dimension metadata can be stored at different levels: Global, User Group or Personal Aggregate Banding Dimensions are secure and use powerful Futrix security that controls who can create Global Aggregate Banding Dimensions, and which Aggregate Banding Dimensions are available to what users based on the restrictions imposed on the data source or the Aggregation Dimension, while still allowing flexibility of using the Aggregate Banding Dimension even when the data source is restricted, if so desired.

The foregoing describes the invention including preferred forms thereof. Modifications and improvements as would be obvious to those skilled in the art are intended to be incorporated in the scope hereof as defined in the accompanying claims.

| Glossary | |
| --- | --- |
| Term | Definition |
| Administrator | The person responsible for configuring/maintaining the application, including maintenance of the data sources and global metadata within the application. |
| Aggregation Dimension | Dimension(s) used to pre-summarize the data for Aggregate Banding, and to establish the Mapping Relationship between its distinct values and the Bucket IDs. |
| Band | Segmentation buckets defined by the Bucket ID that represent a numeric range and have a label for each band segment (e.g. ID1, 0-99.99, "Less than $100"; ID2, 100-199.99, "$100-$199"; ID3, 200-MAX, "Greater than $200") |
| Bucket ID | Generic Identifier for a particular Band. Arbitrary unique value that represents the band, so that there is no dependency on the label of each Band. If any threshold changes or a new band is added or one removed then all Bucket ID's are re-allocated to new bands and the Mapping Relationship will be re-created. However changes to the labels of the Bands will not affect the Bucket IDs at all and therefore a change to the labels of the Bands will not require the Mapping Relationship to be recreated. |
| Detail Level Filters | A set of filters (where clauses) that are applied at the raw detail level data source, i.e. a subset selection of rows based on the values that are stored within the source data (before any aggregation is done) |
| Dimension | A variable/column in the data (numeric or character) that is used for data classification (e.g. Product ID, Region, Item Description). It is used from a "group by" categorical perspective and will have a set of distinct values. |
| End User | The person using the User Interface of the application. This could also be someone writing a query or a process that requires the analysis to be performed. |
| Ignored Bands | Bands that exist within the Aggregate Banding Dimension definition but have been marked as not being required for direct analysis when the Aggregate Banding Dimension is used. All data associated with all the Ignored Bands (and any other unmatched data not specifically allocated to the Bands that are kept) will be grouped together into an implicit "Other" band. |
| Mapping Relationship | The relationship between the distinct values of the Aggregation Dimension into Bands which are represented by the Bucket Ids. This is the clustering/grouping of values into Bands. It can be held in a variety of different ways, but typically is held as a table with two columns (the Aggregate Dimension Values and the Bucket Ids). It is also stored in other ways during our processing depending on the number of distinct values (cardinality) in the relationship. |
| Measure | A numeric variable/column available from the queries that can be used within the Viewpoints. There are a variety of different types of Measures: Data values that can be is summarized or averaged (or used with any other statistic) during analysis (e.g. Total Cost, Paid Amount, Average Age) This can also be a frequency counter value or a "count distinct" counter (e.g. Number of Products, Number of Customers) Calculated Values which are based on a formula using other Measures (e.g. Profit = Revenue − Costs) |
| Post-Aggregation Filters | A set of filters (where clauses) that are applied after aggregation of the data, so that the query results are at a higher level and the Measure values have had some statistical aggregation applied to them (summed, maximized), or counts have been made, or calculations made at the new aggregate level. The filters will then subset the rows based on the values available at this aggregated level. |
| SAS | Programming language from the SAS Institute of Cary, NC, USA. |
| Segmentation Dimension | A Dimension which isn't physically available from the data source but is a Virtual Dimension that is available to End Users for analysis. There are different types of Segmentation Dimensions available, of which Aggregate Banding Dimensions are one example. Other examples available from the Futrix application are Analysis Group Dimensions, Quantile Dimensions and Benchmark Dimensions, but these are not covered or discussed within this document. |

-continued

Glossary

| Term | Definition |
| --- | --- |
| Viewpoint | The view of the data, which is aggregated and presented to the user in the Futrix Application and is based on the most current data and the saved definition of the Viewpoint: Classification Dimensions, Measures, Filters and the layout of how the Dimensions and Measures are rendered (e.g. row and column Dimensions for tabular reports, or grouping and stacking for bar charts, etc.) |
| Virtual Dimension | Dimension that is available for analysis (classification or filtering), but does not actually exist in the original data source, instead it is dynamically derived on the fly. |

The invention claimed is:

1. A method of aggregate banding in a query of a plurality of data sources originating from a user device in communication with the plurality of data sources, the method comprising:
   defining an aggregate banding dimension for a first data source, the aggregate banding dimension including at least one aggregation variable, at least one banding variable, and at least one band based at least partly on the at least one banding variable;
   storing metadata defining the aggregate banding dimension independently from the plurality of data sources and the user device, wherein the user device from which the query originates stores a reference to the aggregate banding dimension in the absence of storing a definition of the aggregate banding dimension on the user device;
   querying the first data source based at least partly on the aggregation variable;
   automatically summarizing the first data source into one or more aggregation dimensions based at least partly on the at least one aggregation variable, wherein the metadata enables the one or more aggregation dimensions to be linked, and to thereby represent the same entity, between the first data source and a second data source, and wherein a summary of the first data source includes at least one distinct value of the aggregate banding dimension;
   defining a mapping relationship of the at least one distinct value of the aggregate banding dimension to at least one band based on a value of the at least one banding variable, wherein the defining comprises automatically mapping each value of the one or more aggregation dimension based on one or more measures specified in the definition of the aggregate banding dimension;
   querying the second data source based at least partly on the mapping relationship and subsequent to querying the first data source, wherein the second data source contains a different type of data than the first data source; and
   returning results providing any relationship between data of the first data source and the different type of data of the second data source based on the mapping relationship.

2. The method of claim 1, wherein the at least one band includes respective numeric boundaries and/or thresholds.

3. The method of claim 1, wherein the at least one band includes respective user-readable labels.

4. The method of claim 1, further comprising applying at least one detail filter to the summary of the first data source.

5. The method of claim 1, further comprising applying at least one aggregate filter to the summary of the first data source.

6. A non-transitory computer-readable medium for aggregate banding in a query of a plurality of data sources originating from a user device in communication with the plurality of data sources, the non-transitory computer-readable medium having stored thereon processor-executable instructions that, when executed by a processor, cause the processor to perform a method of aggregate banding comprising:
   defining an aggregate banding dimension for a first data source, the aggregate handing dimension including at least one aggregation variable, at least one handing variable, and at least one band based at least partly on the at least one handing variable;
   storing metadata defining the aggregate handing dimension independently from the plurality of data sources and the user device, wherein the user device from which the query originates stores a reference to the aggregate binding dimension in the absence of storing a definition of the aggregate banding dimension on the user device;
   querying the first data source based at least partly on the aggregation variable;
   automatically summarizing the first data source into one or more aggregation dimensions based at least partly on the at least one aggregation variable, wherein the metadata enables the one or more aggregation dimensions to be linked, and to thereby represent the same entity, between the first data source and a second data source, and wherein a summary of the first data source includes at least one distinct value of the aggregate banding dimension;
   defining a mapping relationship of the at least one distinct value of aggregate handing dimension to at least one band based on a value of the at least one banding variable, wherein the defining comprises automatically mapping each value of the one or more aggregation dimension based on one or more measures specified in the definition of the aggregate handing dimension;
   querying the second data source based at least partly on the mapping relationship and subsequent to querying the first data source, wherein the second data source contains a different type of data than the first data source; and
   returning results providing any relationship between data of the first data source and the different type of data of the second data source based on the mapping relationship.

7. The non-transitory computer-readable medium of claim 6, wherein the at least one band includes respective numeric boundaries and/or thresholds.

8. The non-transitory computer-readable medium of claim 6, wherein the at least one hand includes respective user-readable labels.

9. The non-transitory computer-readable medium of claim 6, wherein the method further comprises applying at least one detail filter to the summary of the first data source.

10. The non-transitory computer-readable medium of claim 6, wherein the method further comprises applying at least one aggregate filter to the summary of the first data source.

11. A system for aggregate banding in a query of a plurality of data sources originating from a user device in communication with the plurality of data sources, the system comprising:
a processor configured to:
define an aggregate banding dimension for a first data source, the aggregate banding dimension including at least one aggregation variable, at least one banding variable, and at least one band based at least partly on the at least one handing variable;
store metadata defining the aggregate banding dimension independently from the plurality of data sources and the user device, wherein the user device from which the query originates stores a reference to the aggregate handing dimension in the absence of storing a definition of the aggregate handing dimension on the user device;
query the first data source based at least partly on the aggregation variable;
automatically summarize the first data source into one or more aggregation dimensions based at least partly on the at least one aggregation variable, Wherein the metadata enables the one or more aggregation dimensions to be linked, and to thereby represent the same entity, between the first data source and a second data source, and wherein a summary of the first data source includes at least one distinct value of the aggregate banding dimension;
define a mapping relationship of the at least one distinct value of the aggregate banding dimension to at least one band based on a value of the at least one banding variable, wherein the defining comprises automatically mapping each value of the one or more aggregation dimension based on one or more measures specified in the definition of the aggregate banding dimension;
query the second data source based at least partly on the mapping relationship and subsequent to performing the query of the first data source, wherein the second data source contains a different type of data than the first data source; and
return results providing any relationship between data of the first data source and the different type of data of the second data source based on the mapping relationship.

12. The system of claim 11, wherein the at least one band includes respective numeric boundaries and/or thresholds.

13. The system of claim 11, wherein the at least one band includes respective user-readable labels.

14. The system of claim 11, wherein the processor is further configured to apply at least one detail filter to the summary of the first data source.

15. The system of claim 11, wherein the processor is further configured to apply at least one aggregate filter to the summary of the first data source.

16. The method of claim 1, wherein the collection of data in the table is organized based on one or more metadata definitions.

17. The method of claim 16, wherein a metadata definition of the one or more metadata definitions is utilized as the aggregate banding dimension.

18. The method of claim 16, wherein the one or more metadata definitions are common between the first data source and the second data source.

19. The method of claim 1, wherein the user device from which the query originates further stores a reference to the definition of the aggregate banding dimension in the absence of storing the mapping relationship on the user device.

20. The method of claim 1 further comprising: storing the metadata at different levels, the different levels including a global level, a user group level, and a personal level; and restricting or allowing access to specific metadata and aggregate banding dimensions based on permissions for each of the different levels.

* * * * *